(12) United States Patent
Kamiya et al.

(10) Patent No.: US 6,332,655 B1
(45) Date of Patent: Dec. 25, 2001

(54) ELECTROMAGNETIC VALVE FOR A HYDRAULIC BRAKE

(75) Inventors: Masahiko Kamiya, Anjo; Yozo Majima, Kariya, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/449,417

(22) Filed: Nov. 29, 1999

(30) Foreign Application Priority Data

Nov. 30, 1998 (JP) .................................................. 10-340096
Sep. 14, 1999 (JP) .................................................. 11-260604

(51) Int. Cl.$^7$ ............................... B60T 8/36; F16K 31/06
(52) U.S. Cl. ..................................... 303/119.2; 303/113.1
(58) Field of Search .............................. 303/113.1, 113.2, 303/119.2; 251/129.02, 129.07, 129.15, 129.19

(56) References Cited

U.S. PATENT DOCUMENTS

| | | | |
|---|---|---|---|
| 5,647,644 | * 7/1997 | Volz et al. | 303/119.2 |
| 5,673,980 | * 10/1997 | Schwarz et al. | 251/129.02 |
| 5,803,556 | * 9/1998 | Weis et al. | 251/129.02 |
| 5,887,956 | * 3/1999 | Rausch | 303/119.2 |
| 6,082,833 | * 7/2000 | Hosoya | 303/119.2 |
| 6,086,164 | * 7/2000 | Oehler et al. | 303/119.2 |
| 6,152,420 | * 11/2000 | Hohl | 303/119.2 |

FOREIGN PATENT DOCUMENTS

| | | |
|---|---|---|
| 6-241341 | 8/1994 | (JP) . |
| 7-310850 | 11/1995 | (JP) . |
| 10-141517 | 5/1998 | (JP) . |
| 11-072176 | 3/1999 | (JP) . |
| 11-115711 | 4/1999 | (JP) . |
| 11-115712 | 4/1999 | (JP) . |

* cited by examiner

*Primary Examiner*—Christopher P. Schwartz
(74) *Attorney, Agent, or Firm*—Pillsbury Winthrop LLP

(57) ABSTRACT

The electromagnetic valve is comprised of first communication path and second communication path with a throttle connected in parallel to each other, a first plunger having a first valve for interrupting/communicating the first communication path and having a penetration hole extending to the second communication path, a second plunger having a second valve movable in or through the penetration hole for interrupting/communicating the second communication path, a spring member for generating spring biasing force and a coil member for generating an electromagnetic attracting force, when energized, to have the first and second plungers come close to each other against the spring biasing force. The electromagnetic valve may be controlled in a manner that the first communication path is interrupted and the second communication path is communicated at a pressure-increase timing during an anti-skid control.

19 Claims, 15 Drawing Sheets

ELECTROMAGNETIC VALVE FOR A HYDRAULIC BRAKE

CROSS REFERENCE TO RELATED APPLICATION

This application is based upon and claims priority from Japanese Patent Applications No. Hei 10-340096 filed Nov. 30, 1998 and No. Hei 11-260604 filed Sep. 14, 1999, the contents of which are incorporated herein by reference.

BACKGROUND OF THE INVENTION

1. Field of the Invention

The present invention relates to an electromagnetic valve for brake hydraulic pressure control valve and a brake control system having the same for vehicle, in particular, applicable to an ABS actuator for controlling vehicle wheel lock by increasing and decreasing hydraulic pressure.

2. Description of Related Art

The ABS actuator for an anti-skid control is provided with a hydraulic circuit composing fluid conduits and various control valves in which the control valves are operative for increasing/decreasing hydraulic pressure to be applied to wheel cylinders by controlling a communicating/interrupting state of each of the fluid conduits.

There is a pressure-increase control valve (normally open state valve), as one of the various control valves, for controlling the communicating/interrupting state of the fluid conduit connecting a master cylinder and each of the wheel cylinders.

The pressure-increase control valve is under a communicating state during a normal braking operation (not during the anti-skid control) and, thus, operative for allowing brake fluid to flow from a master cylinder side to a wheel cylinder side.

The pressure-increase control valve is turned to an interrupting state at a pressure-hold timing or a pressure-decrease timing during the anti-skid control in order to inhibit brake fluid to flow from the master cylinder side to the wheel cylinder side and switched to the communicating state at a pressure-increase timing during the anti-skid control in order to allow brake fluid to flow from the master cylinder side to the wheel cylinder side.

However, the conventional pressure-increase control valve has a problem that, when switched to the communicating state at a pressure-increase timing during the anti-skid control, large amount of brake fluid flows instantaneously because the diameter of the valve hole is defined to be large enough to allow brake fluid to flow during the normal braking operation. The instantaneous large amount brake fluid flow generates a hydraulic shock wave leading to a large pulsating pressure vibration that causes noises.

SUMMARY OF THE INVENTION

The present invention is made in light of the foregoing problem, and it is an object of the present invention to provide an electromagnetic valve for brake fluid control, for example, a pressure increase control valve, having a distinctive feature that the instantaneous large amount brake fluid flow may be restricted when brake fluid pressure is controlled, in particular, at a pressure-increase timing during the anti-skid control.

Further, it is another object of the present invention to provide an electromagnetic valve applicable to a so-called "normally-open" or "normally closed" state valve.

To achieve the above objects, the electromagnetic valve comprises first and second communication paths connecting an inlet and an outlet for brake fluid flow in parallel to each other, one of the first and second communication paths having a throttle for partly restricting brake fluid flow, a first plunger being provided with first valve for interrupting/communicating the first communication path and, further, provided with a penetration hole extending to the second communication path, a second plunger being provided with second valve movable in or through the penetration hole for interrupting/communicating the second communication path, a spring generating a spring biasing force in a direction that the first and second plungers move away from each other, and a coil member arranged around outer circumferences of the first and second plungers for generating an electromagnetic attracting force, when energized, to have the first and second plungers come close to each other against the spring biasing force.

The electromagnetic valve above mentioned may be controlled. at any one of three operating states representing a fully-open state that both the first and second communication paths are communicated, a half-open state that the one of the first and second communication paths having the throttle is communicated and the other one of the first and second communication paths is interrupted and a fully-closed state that both the first and second communication paths are interrupted.

At pressure-increase timing, the electromagnetic valve is controlled at the half-open state so as to allow brake fluid flow through the throttle so that brake fluid flow may be limited, compared with brake fluid flow at the fully-open state. As a result, the pulsating pressure vibration due to instantaneous large amount brake fluid flow can be prevented.

To achieve the above objects, a first spring is disposed between the first and second plungers arranged in series for generating a first spring biasing force against the first and second plungers in a direction that the first and second plungers move away from each other. Therefore, when the coil member is energized, the first valve may be operative for moving from an upstream side of brake fluid flow to a downstream side thereof to communicate or interrupt the first communication path and the second valve may be operative for moving from an downstream side of brake fluid flow to a upstream side thereof to communicate or interrupt the second communication path. As a modification, in addition to the first spring, a second spring may be disposed between the first plunger and a first seat valve provided with the first communication path for generating a second spring biasing force against the first plunger in a direction that the first plunger comes close to the second plunger. As the first spring biasing force is larger than the second spring biasing force so that a sum of the first and second spring biasing forces may act in a direction that the first and second plungers move away from each other, the first and second valves are operative respectively as mentioned above when the coil member is energized.

Furthermore, it is a further object to provide an electromagnetic valve having a simple and compact construction by which the electromagnetic valve is not only accurately operative but also assembled or manufactured at low cost.

To achieve the above object, an area of the first valve to receive brake fluid pressure on an upstream side thereof is defined to be large enough to generate a pressure biasing force due to brake fluid pressure difference between the upstream side of the first valve and a downstream side thereof that is larger than the first spring biasing force or the sum of the first and second spring biasing forces at the half-open state. As a result, once the half-open state has been established by generating the magnetic attracting force that is larger than the first spring biasing force or the sum of the first and second spring biasing forces at the half-open state, the half-open state may be maintained even if the magnetic attracting force is removed, that is, without current supply to the coil member.

Further, a second seat valve having the second communication path, the throttle and a second valve seat is integrated into the first valve as one body. Thus, the number of component parts may be minimized.

Furthermore, the coil member comprises a coil, a yoke surrounding an outer circumference of the coil, a cylindrical shaped sleeve made of non-magnetic material in which the first and second plungers are slidably housed, and a ring member made of magnetic material disposed between the yoke and the first seat valve without intervening the sleeve. As a result, a magnetic efficiency may be improved because the magnetic circuit for generating the magnetic attracting force passes only one time through the non-magnetic sleeve.

As another aspect of the present invention, the coil member may have a cylindrical shaped sleeve made of basically magnetic material in place of the non-magnetic sleeve. However, the sleeve has a non-magnetic substance at a place corresponding to an outer circumference of the gap between the first and second plungers. Therefore, the magnetic circuit does not pass through the non-magnetic substance so that magnetic efficiency may be improved.

Further, the first seat valve is housed inside an opening of the sleeve together with the first and second plungers. As the sleeve is provided with a construction by which the electromagnetic valve may be assembled to a housing for brake fluid pressure control system.

Furthermore, the first seat valve comprises a nearly cylindrical shaped seat valve member constituting the first valve seat and the first communication path and a nearly cylindrical shaped guide member surrounding an outer circumference of the seat valve member. An inside diameter of the guide member is larger than each of outside diameters of the first and second plunger members so that the first and second plungers may be assembled from one side, thus; resulting in improving assembly productivity.

Furthermore, a seat valve is provided with the first and second communication paths with respective first and second valve seats. As precision machining and higher hardness are required for the seat valve and the seat valve is constituted by a component part, the fabrication of other component parts become simpler and a total manufacturing productivity may be improved.

When the electromagnetic valve is applied to an brake pressure control system having a hydraulic conduit for controlling brake fluid flow between a master cylinder and wheel cylinder, the inlet of the electromagnetic valve is connected to the hydraulic conduit on a side of the master cylinder and the outlet of the electromagnetic valve is connected to the hydraulic conduit on a side of the wheel cylinder.

BRIEF DESCRIPTION OF THE DRAWINGS

Other features and advantages of the pre sent invention will be appreciated, as well as methods of operation and the function of the related parts, from a study of the following detailed description, the appended claims and the drawings, all of which form a part of this application. In the drawings:

DESCRIPTION OF PREFERRED EMBODIMENT

First Embodiment

Figure 1:
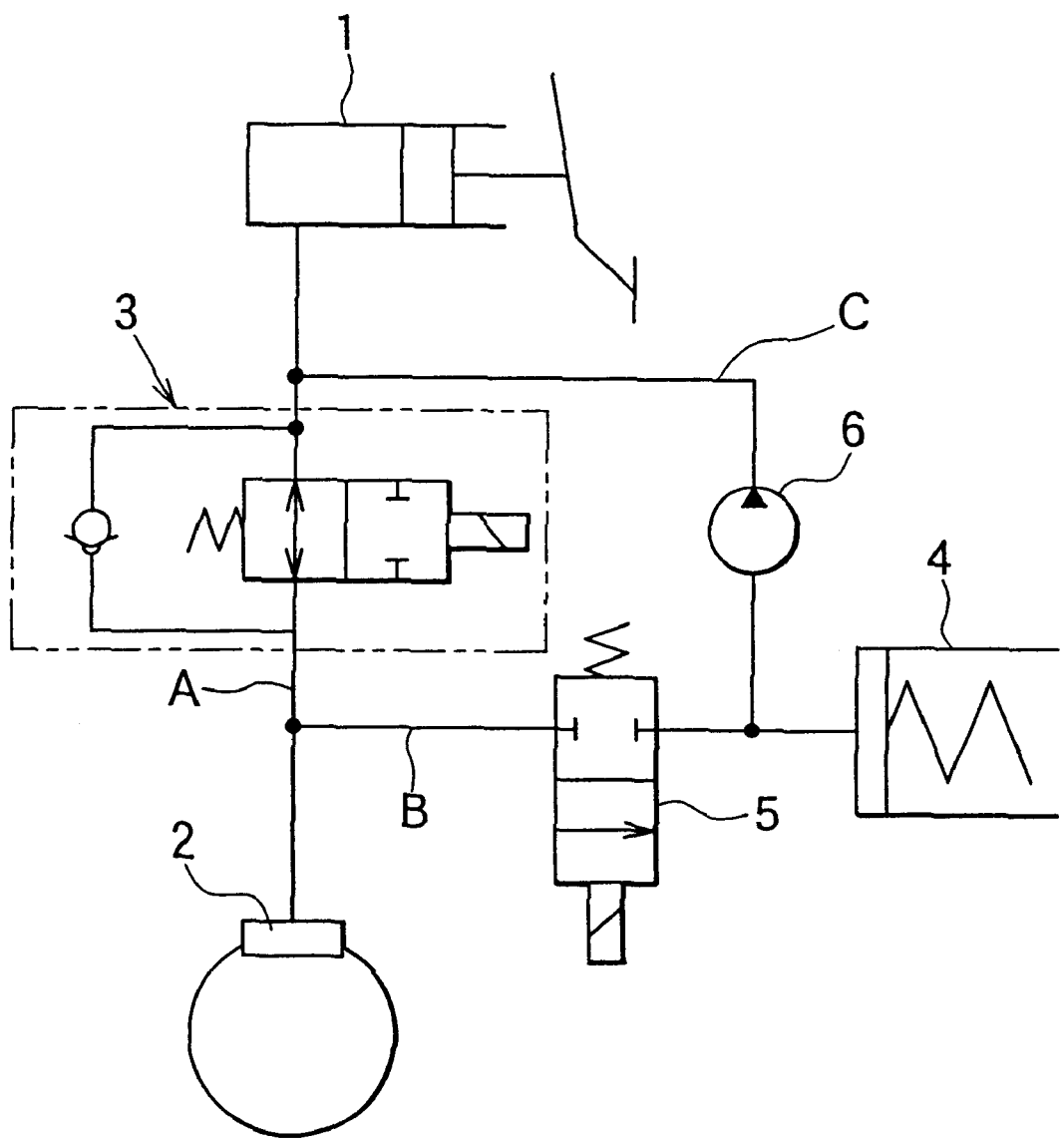
FIG. 1 is a schematic view of a hydraulic circuit of a brake control system in which a pressure control valve according to the first embodiment of the present invention is applied.

A hydraulic circuit of a brake control system having an ABS actuator incorporating preferable embodiments of the present invention is shown in FIG. 1.

A fluid conduit A connects a master cylinder 1 (hereinafter referred as M/C 1) and a wheel cylinder 2 (hereinafter referred as W/C 2). Brake fluid flows through the fluid conduit A from the M/C 1 to the W/C 2. The fluid conduit A is provided with a pressure-increase control valve 3 that controls a communicating/interrupting state of the fluid conduit A. The pressure-increase control valve 3 includes a relief valve operative for allowing brake fluid to flow only from the W/C side to the M/C side.

A fluid conduit B is connected at an end to a reservoir 4 and at the other end to the fluid conduit A on a W/C side (downstream side) of the pressure-increase control valve 3.

The fluid conduit B is provided with a pressure-decrease control valve 5 that controls a communicating/interrupting state of the fluid conduit B. The pressure-decrease control valve 5 is at an interrupting state during the normal braking operation and turned to a communicating state at the pressure-decrease timing during the anti-skid control so as to release brake fluid in the fluid conduit A to the reservoir 4 so that W/C pressure may decrease.

A fluid conduit C is connected at an end to the reservoir 4 and at the other end to the fluid conduit A on a M/C side (upstream side) of the pressure-increase control valve 3. The fluid conduit C is provided with a pump 6 capable of sucking brake fluid from the reservoir 4 and discharging to return the same to the fluid conduit A.

Figure 2:
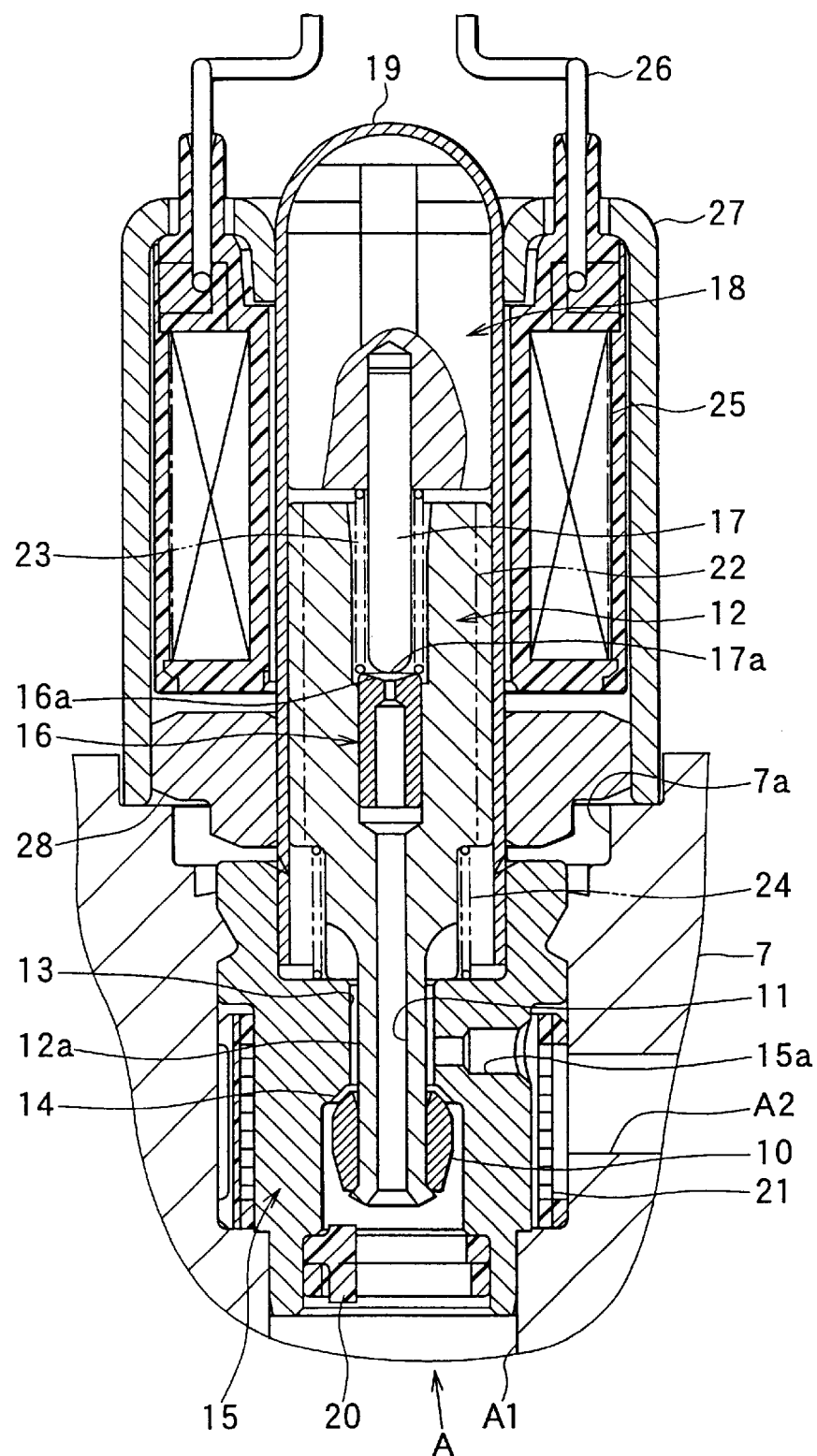
FIG. 2 is a cross sectional view of the pressure-increase control valve according to the first embodiment of the present invention.

The pressure-increase control valve 3 is hereinafter described in reference with FIG. 2, which shows a cross sectional view of the pressure-increase control valve 3 installed in a housing 7 of the ABS actuator.

The pressure-increase control valve 3 constituted by a poppet type electromagnetic valve is put in a hollow portion 7a provided in the housing 7 and then fixed with the housing 7 by caulking a part of the housing 7. The hollow portion 7a of the housing 7 is formed to communicate to the fluid conduit A composing conduits A1 and A2 provided in the housing 7. The conduit A1 on an upstream side of the pressure-increase control valve 3 is connected to the M/C 1 and the conduit A2 on a downstream side of the pressure-increase control valve 3 is connected to the W/C 2.

The pressure-increase control valve 3 is provided with a first plunger 12 of a hollowness type having a valve body 10 at a leading end and a communication path 11 penetrating axially, a first seat valve 15 having a communication path (valve hole) 13 for brake fluid and a valve seat 14 on which the valve body 10 of the first plunger 12 is seated, a second seat valve 16 formed inside the communication path 11 of the first plunger 12, a second plunger 18 having a valve body 17 to be seated on the second seat valve 16, and a sleeve 19 housing the first and second plunger 12 and 18.

The sleeve 19 is made of nonmagnetic material such as stainless. The sleeve 19 is shaped as a cup having an opening at an end and the bottom of the cup is formed nearly in a hemispherical shape. The first plunger 12 is arranged on the opening side of the sleeve 19 and a leading end portion 12a thereof protrudes out of the sleeve 19. On the other hand, the second plunger 18 is arranged on the bottom side of the sleeve 19. The first and second plungers 12 and 18 are slidably movable in the sleeve 19, respectively. The second plunger 18 may be movable so as to come in contact with the bottom of the sleeve 19, which restricts the slidable movement of the second plunger 18 in an upper direction in the drawing.

The first seat valve 15 is retained to the hollow portion 7a of the housing 7 and fixed with the housing 7 by caulking a part of the housing 7. The communication path 13 of the first seat valve 15 is provided with a step portion whose diameter on the upstream side of brake fluid flow is larger than that on the downstream side thereof. The corner of the step portion is tapered to constitute the valve seat 14. The leading end portion 12a is housed in a smaller diameter portion of the communication path 13 on the downstream side and protruded into a larger diameter portion of the communication path 13 on the upstream side. The valve body 10 is disposed so as to surround the circumferencial surface of such protruded portion of the reading end portion 12a. When the first plunger 12 slidably moves in the sleeve 19 in the upper direction of the drawing, the valve body 10 seats on the valve seat 14 so that the communication path 13 may be interrupted.

A penetration hole 13a is formed in a side wall of the first seat valve 15 to communicate the communication path 13 to outside of the seat valve 15. Brake fluid flows from the conduit A1 through the penetration hole 15a to the conduit A2. The diameter of the penetration hole 15a may be arbitrarily defined and, in the present embodiment, is large enough to allow brake fluid to flow sufficiently from the conduit A1 to the conduit A2.

Filters 20 and 21 are disposed at an inlet of the communication path 13 (opening portion on the conduit A1 side) and at an outlet of the penetration hole 15a (opening portion on the conduit A2 side), respectively, to prevent foreign material contained in brake fluid from entering into the pressure-increase control valve 3.

An inner wall of the communication path 11 of the first plunger 12 is facilitated with step portions whose diameters become larger stepwise from the upstream side of brake fluid toward the downstream side thereof. The second seat valve 16 is press fitted to the communication path 11 on a way of the step portions thereof so as to integrate with the first plunger 12. The second seat valve 16 is provided with a valve hole giving a throttle effect on the communication path 11. The valve body 17 of the second plunger 18 is housed in the communication path 11. According to the slide movement of the second plunger 18 in the sleeve 19 in a down direction of the drawing, a spherical shaped leading end portion 17a of the valve body 17 is seated on a valve seat 16a of the second seat valve 16 in order to interrupt the communication path 11. A lift stroke L1 of the valve body 17 of the second plunger 18 (a distance which the second seat valve 16 moves most far away from the valve seat) is larger than a lift stroke L2 of the valve body 10 of the first plunger 12 (a distance which the first seat valve 15 moves most far away from the valve seat 14).

Grooves 22 (two dots-dash lines in the drawing) extending in an axial direction of the first plunger are formed at outer circumferences of the first plunger 12. Therefore, brake fluid flowing from the conduit A1 via the communication path 11 passes through the grooves 22 and flows to the fluid A2 via the penetration hole 15a formed in the first seat valve 15. The flowing amount of brake fluid flowing through the communication path 11 is controlled by the throttle effect of the second seat valve 16.

The communication path 11 is partly provided with a spring 23 giving a force to the first and second plungers 12 and 18 in such a direction that the first plunger 12 and the second plunger 18 are separated from each other.

A spring 24 is disposed between the first plunger 12 and the first seat valve 15. The spring 24 gives the first plunger 12 a force acting in such a direction that the first plunger 12 moves far from the first seat valve 15 (in a direction that the valve body is seated on the first seat valve 15).

The elastic force of the spring 23 is larger than that of the spring 24 so that the first plunger 12 does not come in contact by the second plunger 18 by the elastic force of the spring 24, that is, the valve body 17 can not be seated on the valve seat 16a.

A coil 25 for constituting a magnetic circuit is placed around the outer surface of the sleeve 19. Terminals 26 extend from the coil 25 and electric power is supplied to the coil 25 through the terminals 26.

The circumferential surface of the coil 25 is surrounded by a near cup shaped yoke 27 having a circular entrance from which the coil 25, the sleeve 19 and so on are inserted for assembly.

An entrance of the hollow portion 7a of the housing 7 is formed in a circular shape similarly with that of the yoke 27.

A diameter of the entrance of the hollow portion 7a is slightly larger than that of the yoke 27. The entrance of the hollow portion 7a is provided with a step shaped portion at a place where the leading end of the yoke 27 is located and, when the yoke 27 is inserted into the hollow portion 7a, the step shaped portion thereof serves to position the yoke 27 in its inserting direction relative to the yoke 27. The yoke 27 is fixed with the housing by press fitting the yoke 27 to the hollow portion 7a or caulking the housing 7 at the outer circumference of the yoke 27 after the yoke 27 is inserted into the hollow portion 7a.

A magnetic metal ring member 28 is arranged between the yoke 27 and the sleeve 19 (for example, is press fitted to the yoke 27) and the sleeve 19 is positioned and fixed to the yoke 27 through the ring member 28 so that the first and second plungers 12 and 18 may also be positioned relative to the yoke 27.

Next, operation of the pressure-increase control valve 3 mentioned above is described in reference with FIGS. 3 to 5.

Figure 3:
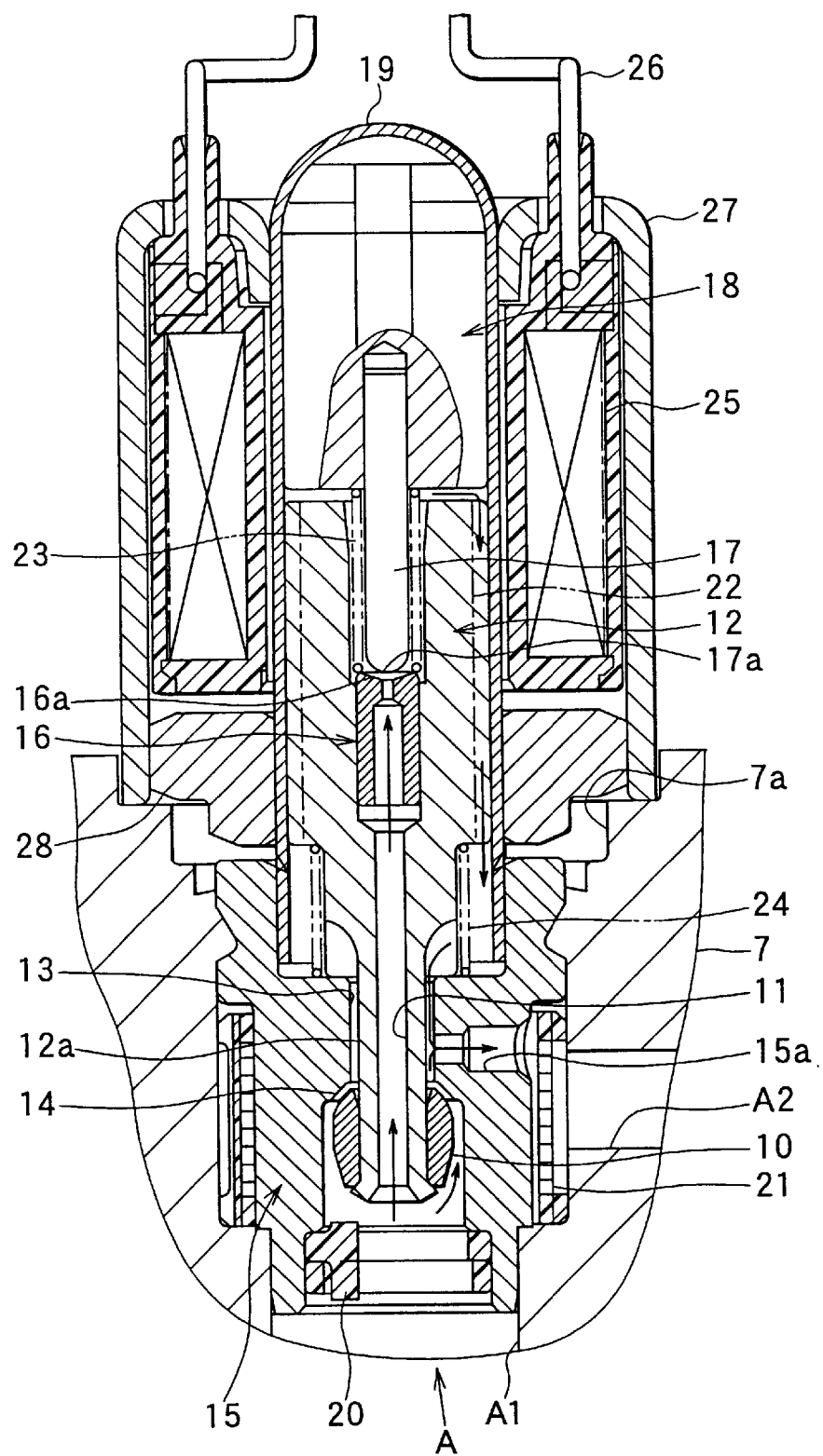
FIG. 3 is a view showing a fully-open state of the pressure-increase control valve according to the first embodiment of the present invention.

FIG. 3 shows a state of the pressure-increase control valve 3 during a normal braking operation, that is, at a time when the coil 25 is not energized. The second plunger 18 is in contact with the bottom of the sleeve 19 and the distance between the first and second plungers 12 and 18 are most far away from each other, since the elastic force of the spring 23 is larger than that of the spring 24. The valve body 10 of the first plunger 12 is away from the valve seat 14 of the first seat valve 15 and the valve body 17 of the second plunger 18 is also away from the valve seat of the second seat valve 16.

Brake fluid flows from the conduit A1 to the conduit A2 as shown by arrows in the drawing, that is, through the communication path 13 and the penetration hole 15a as a flow rout and through the communication path 11, grooves 22 and the penetration hole 15a as another flow rout. Therefore, a sufficient amount of brake fluid responsive to a demand of a vehicle driver flows from the conduit A1 to the conduit A2 at the normal braking operation. The state as shown in FIG. 3 is hereinafter called as a fully-open state.

Figure 4:
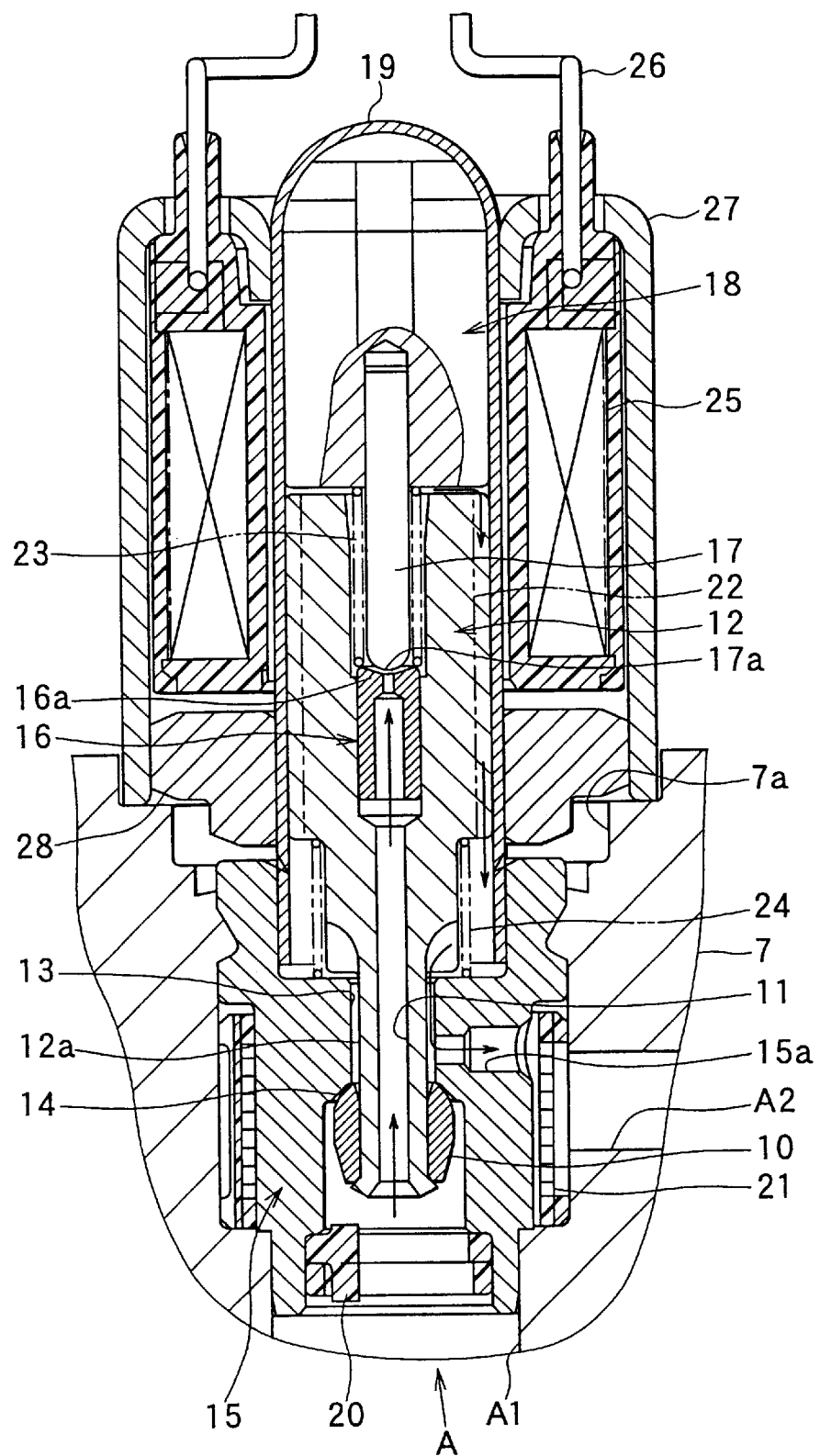
FIG. 4 is a view showing a half-open state of the pressure-increase control valve according to the first embodiment of the present invention.

FIG. 4 shows a state of the pressure-increase control valve 3 at the pressure-increase timing during the anti-skid control, that is, at a time when, after once energizing the coil 25 for pulsating pressure-increase, the current supply to the coil 25 is stopped. When brake fluid pressure is increased during the anti-skid control, it is preferable at an initial stage that smaller amount of brake fluid flows from the conduit A1 to the conduit A2, compared with that during the normal braking operation. The first plunger 12 is slidably moved in an upper direction in the drawing until the valve body 10 of the first plunger 12 is seated on the valve seat 14 of the first seat valve 15 and the second plunger 18 is held so as to keep in contact with the bottom of the sleeve 19.

Therefore, brake fluid flows from the conduit A1 to the conduit A2 as shown by arrows in FIG. 4, that is, through the communication path 11, the grooves 22 and the penetration hole 15a. No brake fluid flows through the communication path 13 and the penetration hole 15a, contrary to the state that brake fluid flows during the normal braking operation.

The flow amount of brake fluid from the conduit A1 to the conduit A2 is controlled by the throttle effect of the second seat valve 16 to obtain an amount corresponding to the demand for pulsating pressure-increase. The state as shown in FIG. 4 is hereinafter called as a half-open state.

Figure 5:
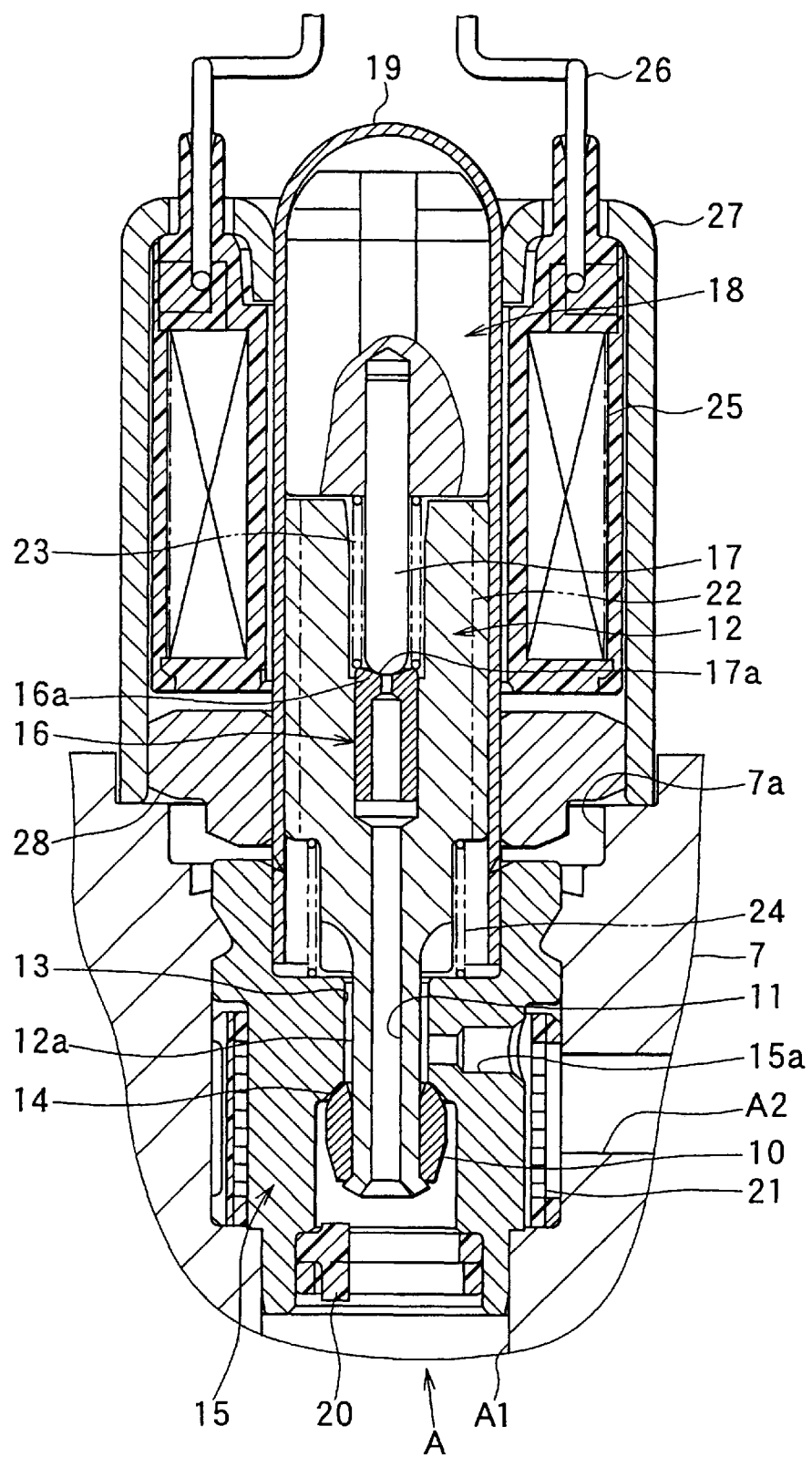
FIG. 5 is a view showing a fully-closed state of the pressure-increase control valve according to the first embodiment of the present invention.

FIG. 5 shows a state of the pressure-increase control valve 3 at the pressure-decrease timing and at the pressure-hold timing during the anti-skid control, that is, at a time when the pressure-increase control valve 3 is closed. The first plunger 12 is slidably moved in an upper direction in the drawing until the valve body 10 of the first plunger 12 is seated on the valve seat 14 of the first seat valve 15 and the second plunger 18 is slidably moved in an down direction in the drawing until the leading end of the second plunger 18 is seated on the second seat valve 16. Therefore, brake fluid flow from the conduit A1 to the conduit A2 is completely interrupted so as to close the pressure-increase control valve 3. The state as shown in FIG. 5 is hereinafter called as a fully-closed state.

As mentioned above, the pressure-increase control valve 3 controls brake fluid flow from the conduit A1 to the conduit A2 at the fully-open state during the normal braking operation, at the fully-closed state at the pressure-decrease and pressure-hold timing during the anti-skid control or at the half-open state at the pressure-increase timing during the anti-skid control.

At the pressure-increase timing during the anti-skid control, the pressure-increase control valve 3 is turned from the fully-closed state to the half-open state so that brake fluid may flow from the conduit A1 to the conduit A2. However, due to the restricted flow amount of brake fluid at the half-open state, large amount of brake fluid never flows instantaneously as observed during the normal braking operation. As a result, there occurs no hydraulic shock wave based on brake fluid flow causing the pulsating fluid pressure so that the generation of noises by the pressure vibration may be prevented.

Figure 6:
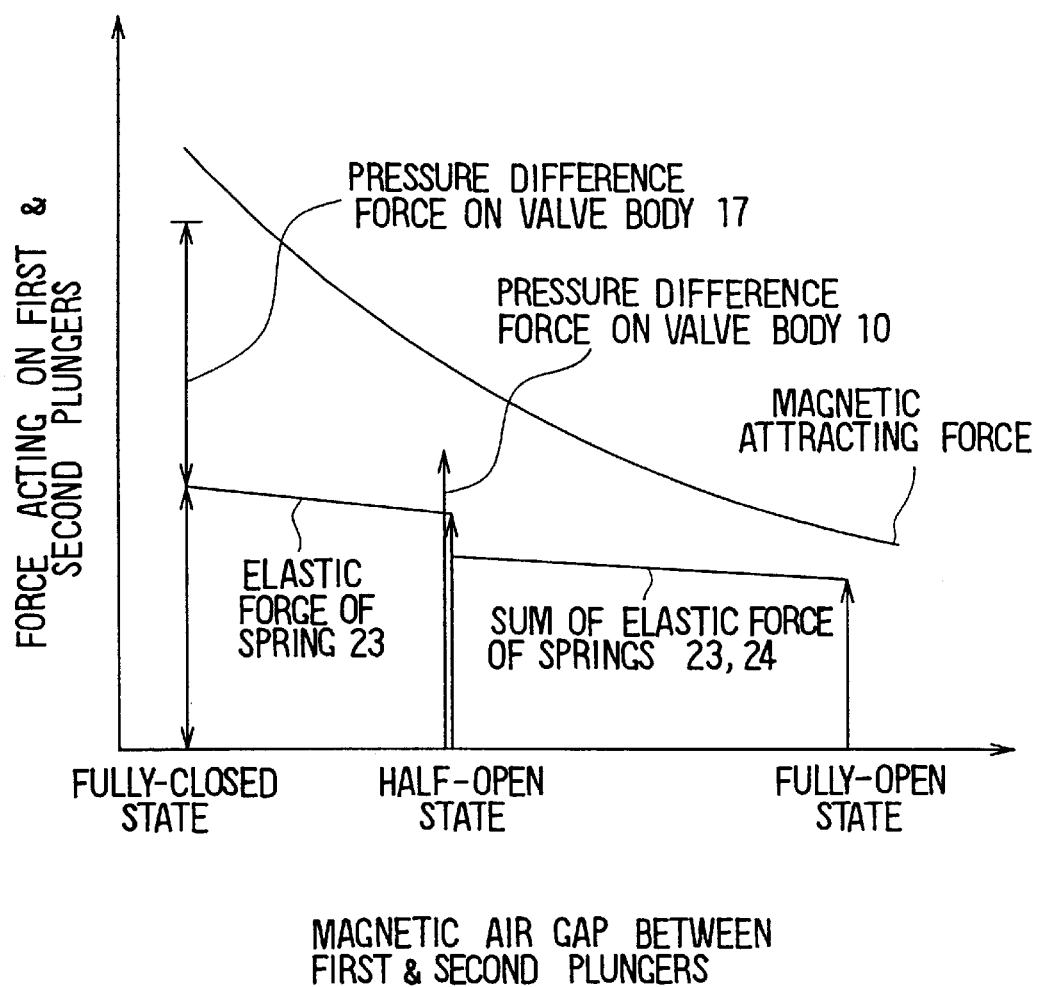
FIG. 6 is a chart showing the relationship between the respective operation states of the pressure-increase control valve and the forces acting on the first and second plungers.

To have the valves mentioned above well operate, forces acting on the first and second plungers 12 and 18 (magnetic attracting forces according to current supply to the coil 25) are defined as described hereinafter. The relationship between the respective operation states of the pressure-increase control valve 3 and the forces acting on the first and second plungers 12 and 18 are described in reference with FIG. 6.

When the fully-open state is moved toward the fully-closed state, a magnetic attracting force enabling to slidably move the first plunger 12 in the upper direction in the drawing is generated by energizing the coil 25. The pressure-increase control valve 3 becomes at the half-open state on a way of moving toward the fully-closed state when the coil 25 is de-energized after the magnetic attracting force exceeds the sum of the elastic forces of the springs 23 and 24.

At the half-open state, as the valve body 10 of the first plunger 12 is seated on the valve seat 14 of the seat valve 15 so that the communication path 13 is interrupted, the valve body 10 receives a pressure difference force influenced by the throttle effect of the second seat valve 16. The first plunger 12 receives a pressure difference force acting in the upper direction in the drawing since brake fluid pressure on the conduit A1 side becomes higher than that on the conduit A2 side due to the throttle effect of the second seat valve 16. On the other hand, the first plunger 12 receives the sum of elastic force acting in the down direction in the drawing by the springs 23 and 24. When the pressure difference force mentioned above in the upper direction in the drawing exceeds the sum of elastic force in the down direction in the drawing, the pressure-increase control valve can keep the half-open state even without the magnetic attracting force. According to the present embodiment, the valve body 10 and the first plunger 12 are defined to receive the pressure difference force which is higher than the elastic force of spring 23 so that the half-open state may be maintained without supplying current to the coil 25.

Further, when the half-open state is moved to the fully-closed state, the coil 25 is energized to generate the magnetic attracting force by which the valve body 17 of the second plunger 18 is seated on the valve seat of the second seat valve 16. At a state that the valve body 17 is seated on the valve seat; the valve body 17 receives a force in an upper direction in the drawing due to the pressure difference between the conduit A1 side and the conduit A2 side. In addition to that, the second plunger 18 receives a force in an upper direction in the drawing by the elastic force of the spring 23. Therefore, the magnetic attracting force, which is larger than the sum of the pressure difference force that the valve body 17 receives and the elastic force of the spring 23, is genera ted for moving to the fully-closed state.

As mentioned above, the pressure increase control valve 3 is well operated by controlling the magnetic attracting force in order to response to the respective valve operation states.

According to the first embodiment, as the first and second plungers 12 and 18 are separately moved by the magnetic attracting force and the pressure difference force between brake fluid pressure on the M/C side and that on the W/C side is used, there is no need of sealing element (for example o-ring) and any other complicated structure so that reliability of the valve may be improved.

Second Embodiment

Figure 7:
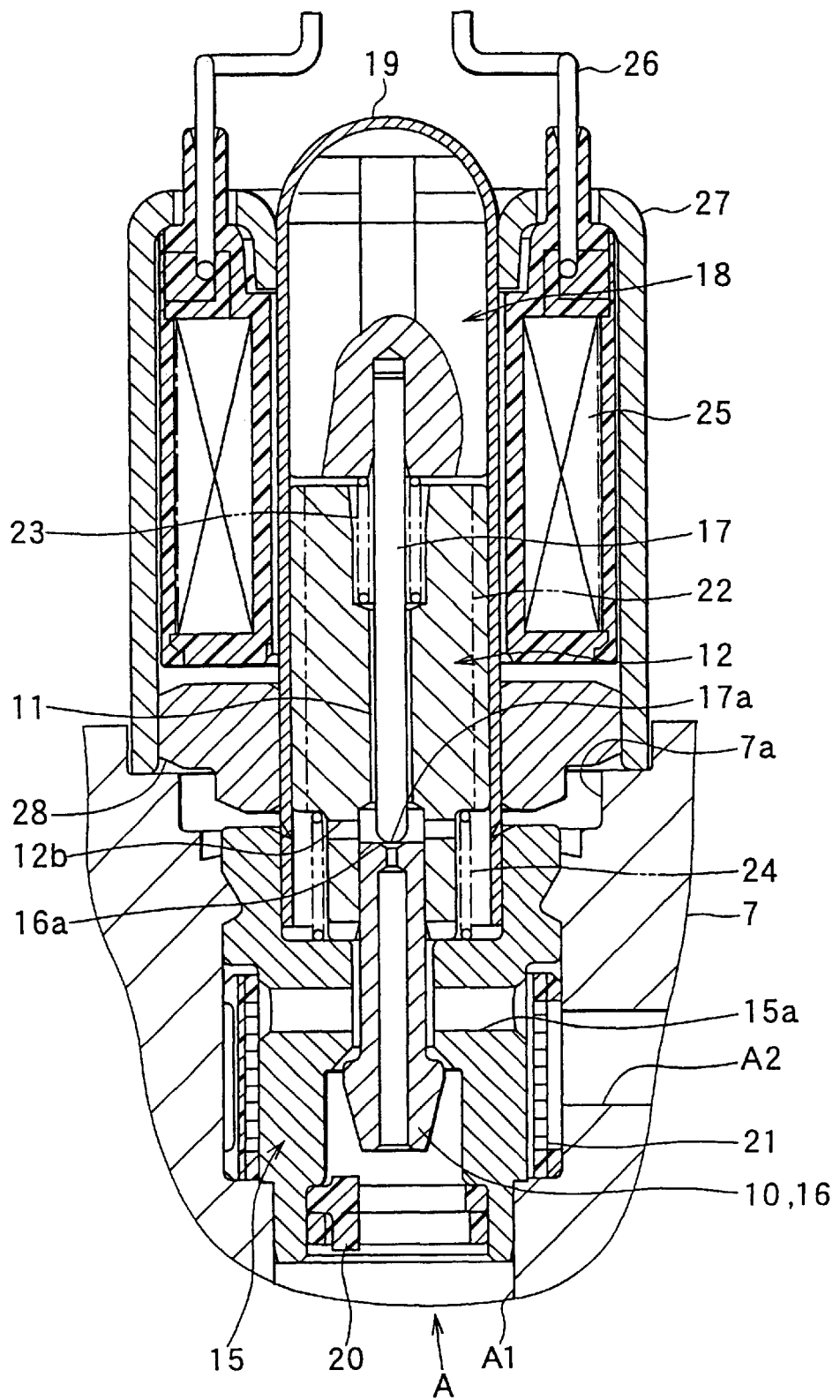
FIG. 7 is a cross sectional view of the pressure-increase control valve according to a second embodiment of the present invention.

A cross sectional view of the pressure-increase control valve 3 according to a second embodiment is shown in FIG. 7. The structure of the pressure-increase control valve 3 according to the second embodiment is modified from that of the first embodiment. As the basic operation of the second embodiment is similar to the first embodiment, only the structure different from the first embodiment is described hereinafter.

As shown in FIG. 7, the second seat valve 16 and the valve body I O (including the leading end portion 12a of the first plunger 12) are constituted by an integrated body. The number of component parts is less, compared with the case that the second seat valve 16 and the valve body 10 are separately constituted.

The valve body 17 of the second plunger 18 is longer and a penetration hole 12b communicating the communication path 11 and the outside of the first plunger 12 is provided at a side wall of the first plunger 12 on a down stream side of the second seat valve 16. Therefore, brake fluid can flow through the penetration hole 12b to the outside of the first plunger 12 so that the length of the communication path 11 may be shortened.

Third Embodiment

Figure 8:
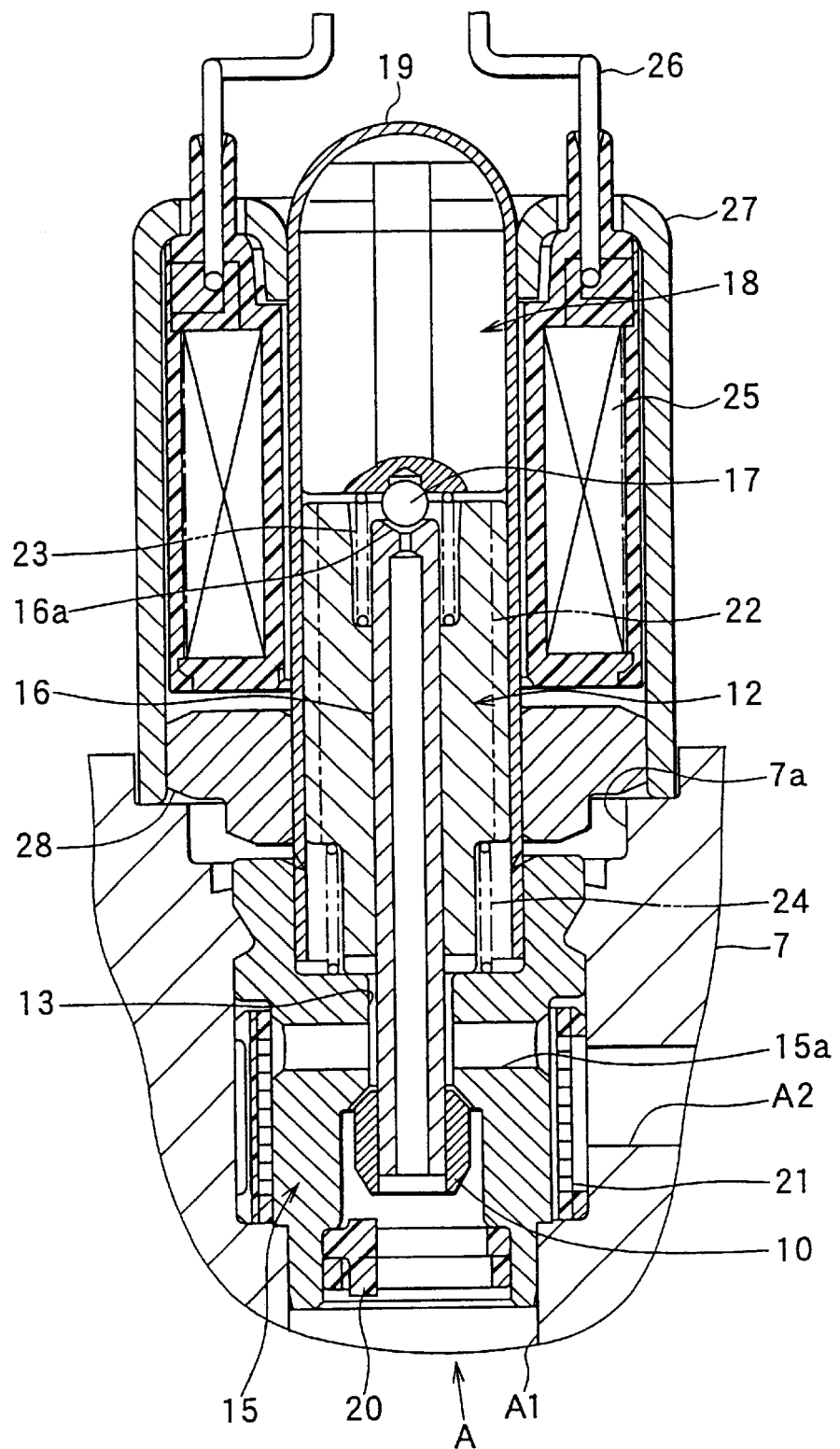
FIG. 8 is a cross sectional view of the pressure-increase control valve according to a third embodiment of the present invention.

A cross sectional view of the pressure-increase control valve 3 according to a third embodiment is shown in FIG. 8. The structure of the pressure-increase control valve 3 according to the third embodiment is modified from that of the first embodiment. As the basic operation of the third embodiment is similar to the first embodiment, only the structure different from the first embodiment is described hereinafter.

As shown in FIG. 8, the valve body 17 provided at the leading end of the second plunger 18 is composed of a ball. The second seat valve 16 is arranged so as to penetrate the first plunger 12 and the valve body 10 is press fitted to the leading end of the second seat valve 16.

Fourth Embodiment

Figure 9:
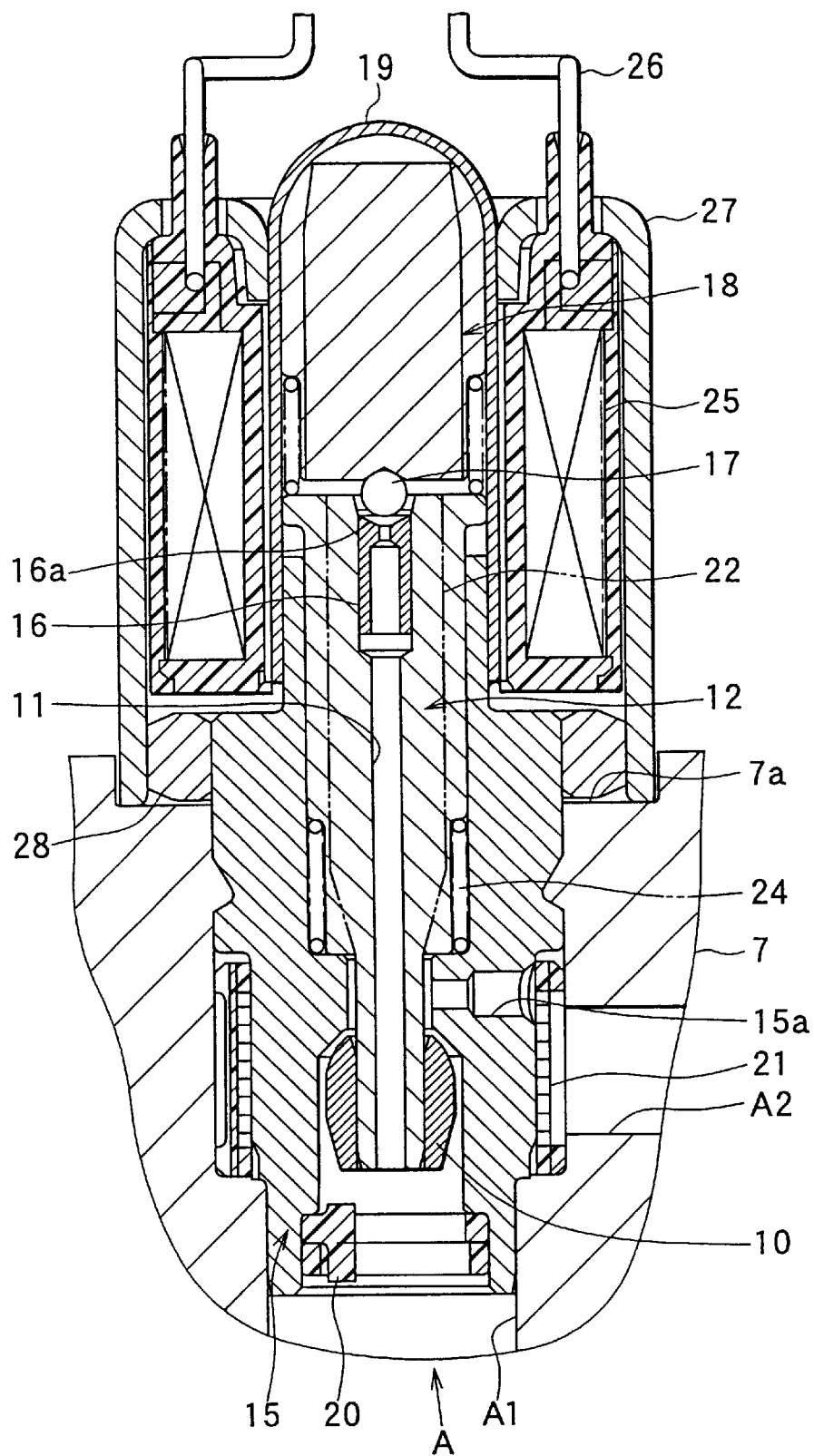
FIG. 9 is a cross sectional view of the pressure-increase control valve according to a fourth embodiment of the present invention.

A cross sectional view of the pressure-increase control valve 3 according to a fourth embodiment is shown in FIG. 9. The structure of the pressure-increase control valve 3 according to the fourth embodiment is modified from that of the first embodiment. As the basic operation of the fourth embodiment is similar to the first embodiment, only the structure different from the first embodiment is described hereinafter.

As shown FIG. 9, the first plunger 12 is inserted into the first seat valve 15 and the ring member 28 is directly in contact with the first seat valve 15 so that the first seat valve 15 may be positioned to the yoke 27 through the ring member 28.

Though the first and second plunger 12 and 18 are positioned to the yoke through the non-magnetic sleeve 19 according to the first embodiment, the first and second plunger 12 and 18 are positioned to the yoke without passing through the non-magnetic sleeve 19 according to the fourth embodiment.

The magnetic circuit of the fourth embodiment to be constituted by the coil 25 has a rout passing from the yoke 27 through the ring member 23, the first seat valve 15, the first plunger 12, the second plunger 18 and the sleeve 19 back to the yoke 27. On the other hand, the magnetic circuit of the first embodiment to be constituted by the coil 25 has a rout passing from the yoke 27 through the ring member 23, the sleeve 19, the first plunger 12, the second plunger 18 and the sleeve 19 back to the yoke 27. That is, though the magnetic circuit of the first embodiment passes through the non-magnetic sleeve 19 twice, the magnetic circuit of the fourth embodiment passes through the non-magnetic sleeve 19 only one time. Thus, a magnetic efficiency of the magnetic circuit can be improved since the time which the magnetic circuit passes through non-magnetic material is less (magnetic gap is limited so that magnetic loss may be prevented).

Fifth Embodiment

Figure 10:
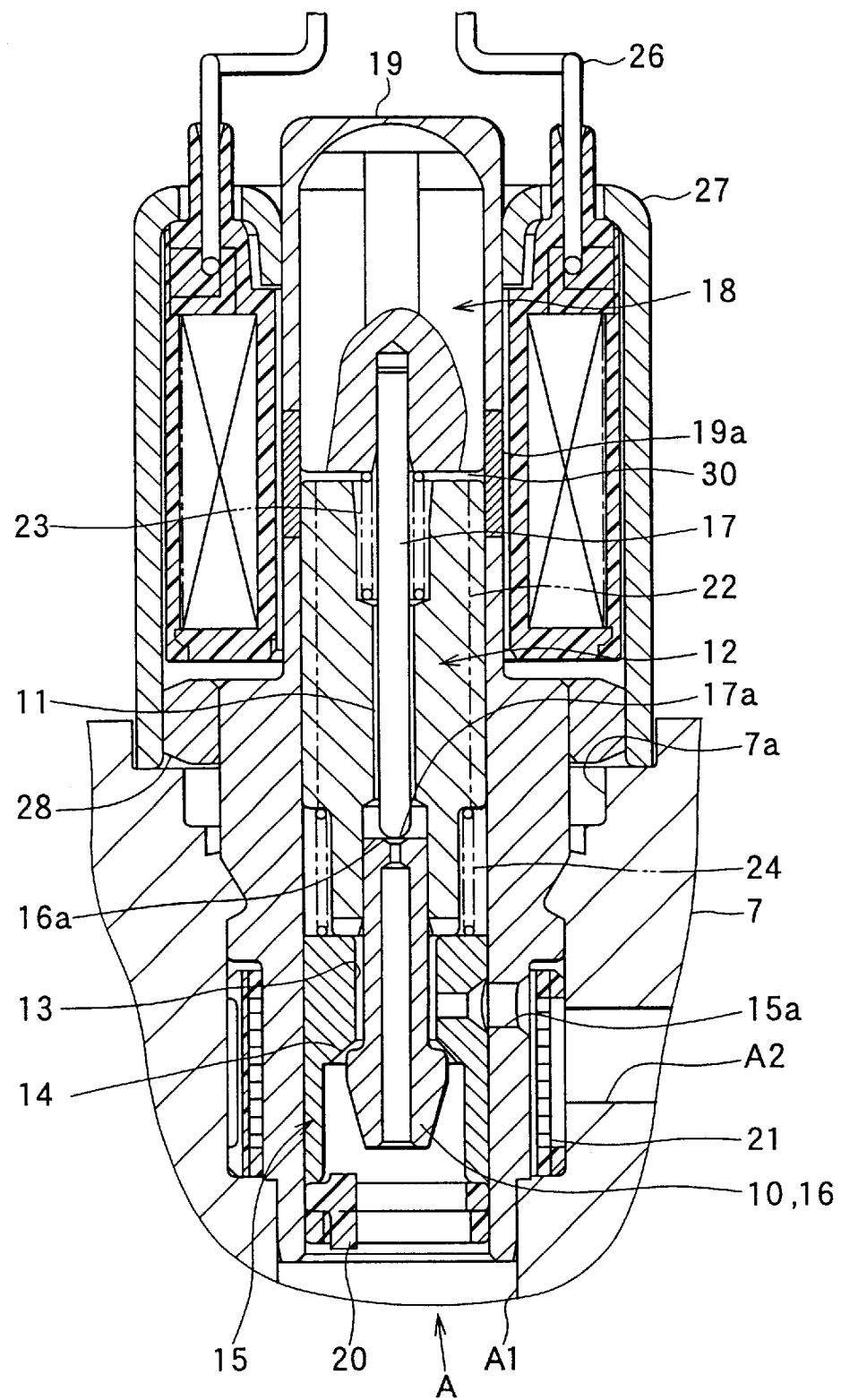
FIG. 10 is a cross sectional view of the pressure-increase control valve according to a fifth embodiment of the present invention.

A cross sectional view of the pressure-increase control valve 3 according to a fifth embodiment is shown in FIG. 10. The structure of the pressure-increase control valve 3 according to the fifth embodiment is modified from that of the second embodiment. As the basic operation of the fifth embodiment is similar to the first embodiment, the explanation thereof is omitted.

According to the fifth embodiment, the first seat valve 15 is press fitted to the inside of a cup shaped magnetic sleeve 19. After the sleeve 19 is inserted to the hollowed portion 7a, a part of the housing 7 is caulked so that the first seat valve 15 together the sleeve 19 is fixed with the housing 7. The sleeve 19 basically made of magnetic material has partly a non-magnetic portion 19a at a position around a gap 30 between the first and second plungers 12 and 18. The non-magnetic portion 19a may be formed, for example, by carrying out the heat treatment for changing to a non-magnetic phase only on a given portion of the sleeve 19 originally made of magnetic material.

The structure mentioned above becomes more compact, compared with the case that the first seat valve 15 is directly fixed with the hollowed portion 7a. Further, as the nonmagnetic portion 19a is provided only on a limited area, the magnetic circuit does not pass through the non-magnetic portion 19a so that the magnetic efficiency may be improved.

Furthermore, after the first and second plungers 12 and 18, the first seat valve 15 and so on are arranged inside the cup shaped sleeve 19, these components together with the sleeve 19 can be fixed to the hollowed portion 7a. Thus, the components can be assembled from one direction so that assembly processes may become simpler.

Sixth Embodiment

Figure 11:
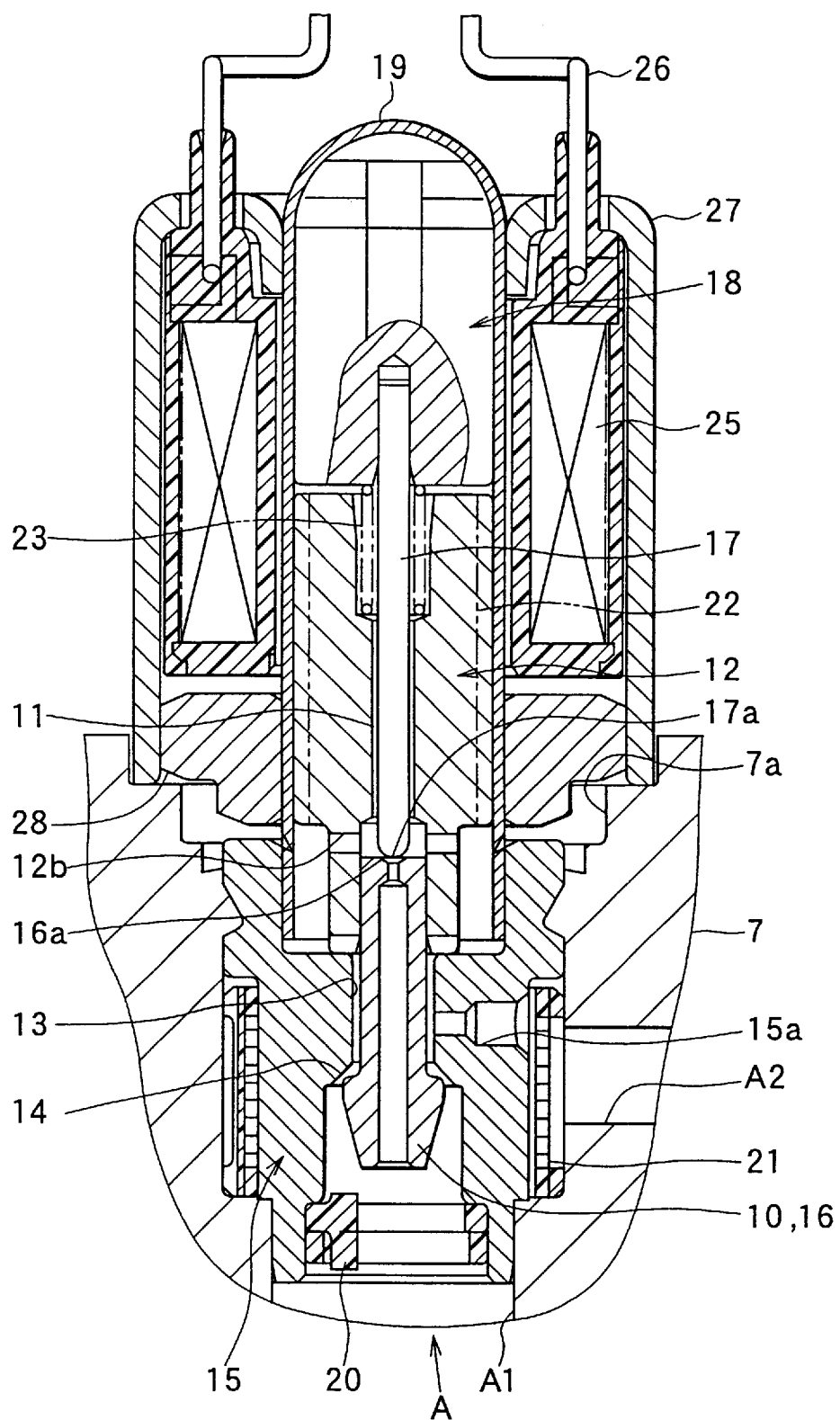
FIG. 11 is a cross sectional view of the pressure-increase control valve according to a sixth embodiment of the present invention.

A cross sectional view of the pressure-increase control valve 3 according to a sixth embodiment is shown in FIG. 11. The structure of the pressure-increase control valve 3 according to the sixth embodiment is modified from that of the second embodiment. Therefore, the modified portions are described hereinafter.

According to the sixth embodiment, the spring 24 of the second embodiment is eliminated. Even if the spring 24 is eliminated in the pressure increase control valve 3, brake fluid flowing from the conduit A1 to the conduit A2 is operative for causing the member constituting the valve body 10 and the second seat valve 16 and the first plunger 12 to move so that the valve operation similar to the first embodiment may be assured, while a simple structure of the valve may be realized.

The other basic operation of the pressure increase control valve 3 according to the sixth embodiment is similar to the first embodiment and the explanation thereof is omitted.

Further, it is possible to eliminate the spring 24 in the first and third embodiments, too.

Seventh Embodiment

Figure 12:
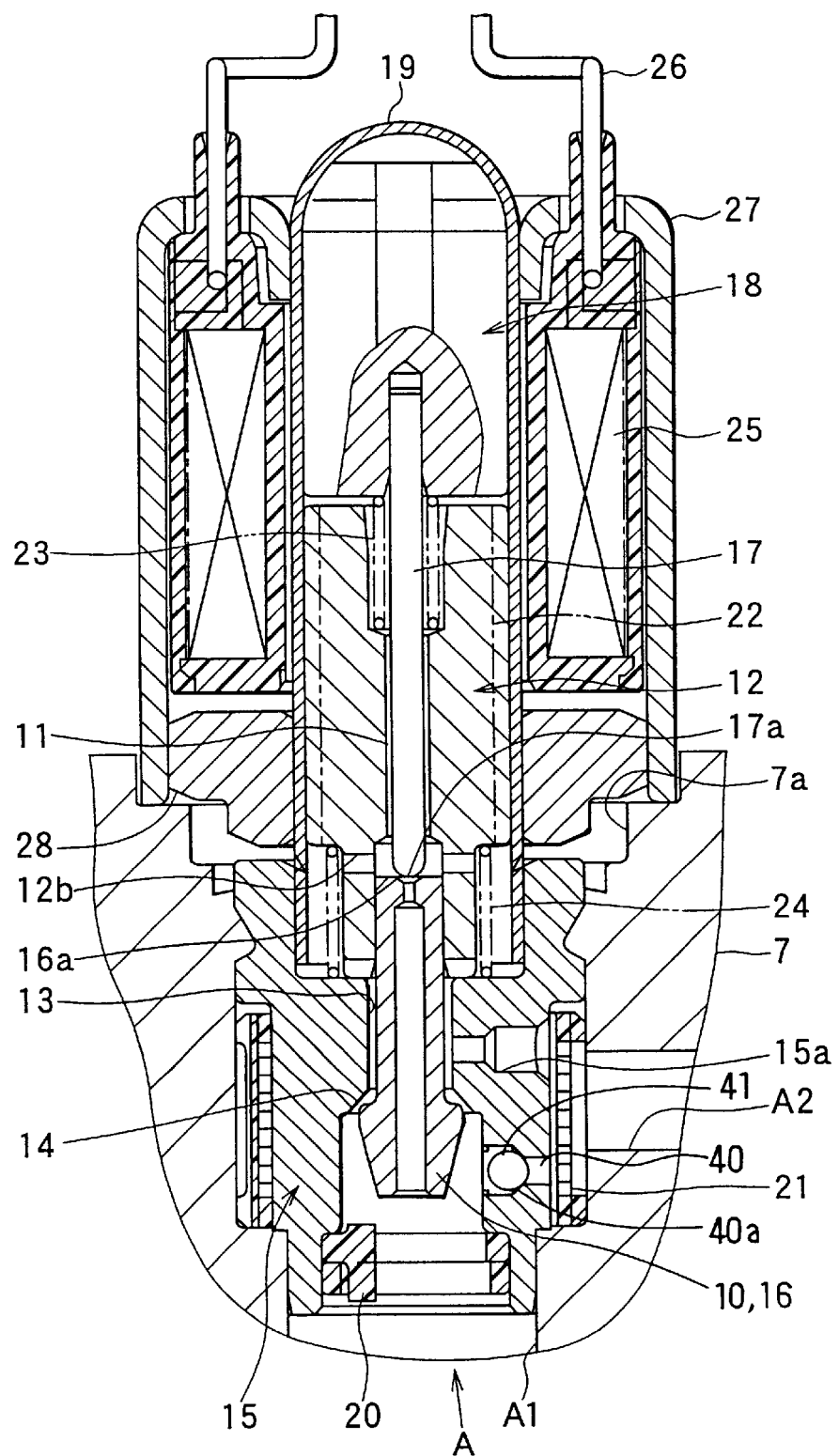
FIG. 12 is a cross sectional view of the pressure-increase control valve according to a seventh embodiment of the present invention.

A cross sectional view of the pressure-increase control valve 3 according to a seventh embodiment is shown in FIG. 12. The structure of the pressure-increase control valve 3 according to the seventh embodiment is modified from that of the second embodiment. As the basic operation of the seventh embodiment is similar to the first embodiment, the explanation thereof is omitted.

According to the seventh embodiment, a conduit 40 as a hydraulic circuit is provided at the first seat valve 15 to communicate from the conduit A1 to the conduit A2 in parallel to the first communication path 13. Disposing a ball valve in the conduit 40 constitutes the relief valve. The conduit 40 provided at the first seat valve 15 is connected to the conduit leading from the end surface of the first plunger 12 to the inner circumferential surface of the first seat valve 15 and is provided with a step portion whose diameter on the inner circumferential side of the first seat valve 15 is larger. A valve seat 40a on which a ball 41 is seated is formed on the step portion. Therefore, brake fluid is allowed to flow only from the conduit A2 side through the conduit 40 to the conduit A1 side.

When a driver releases a brake pedal and brake fluid is returned from the W/C side to the M/C side, a smooth brake fluid return can be realized so that brake operation feeling of the driver on releasing the brake pedal may be improved.

Eighth Embodiment

Figure 13:
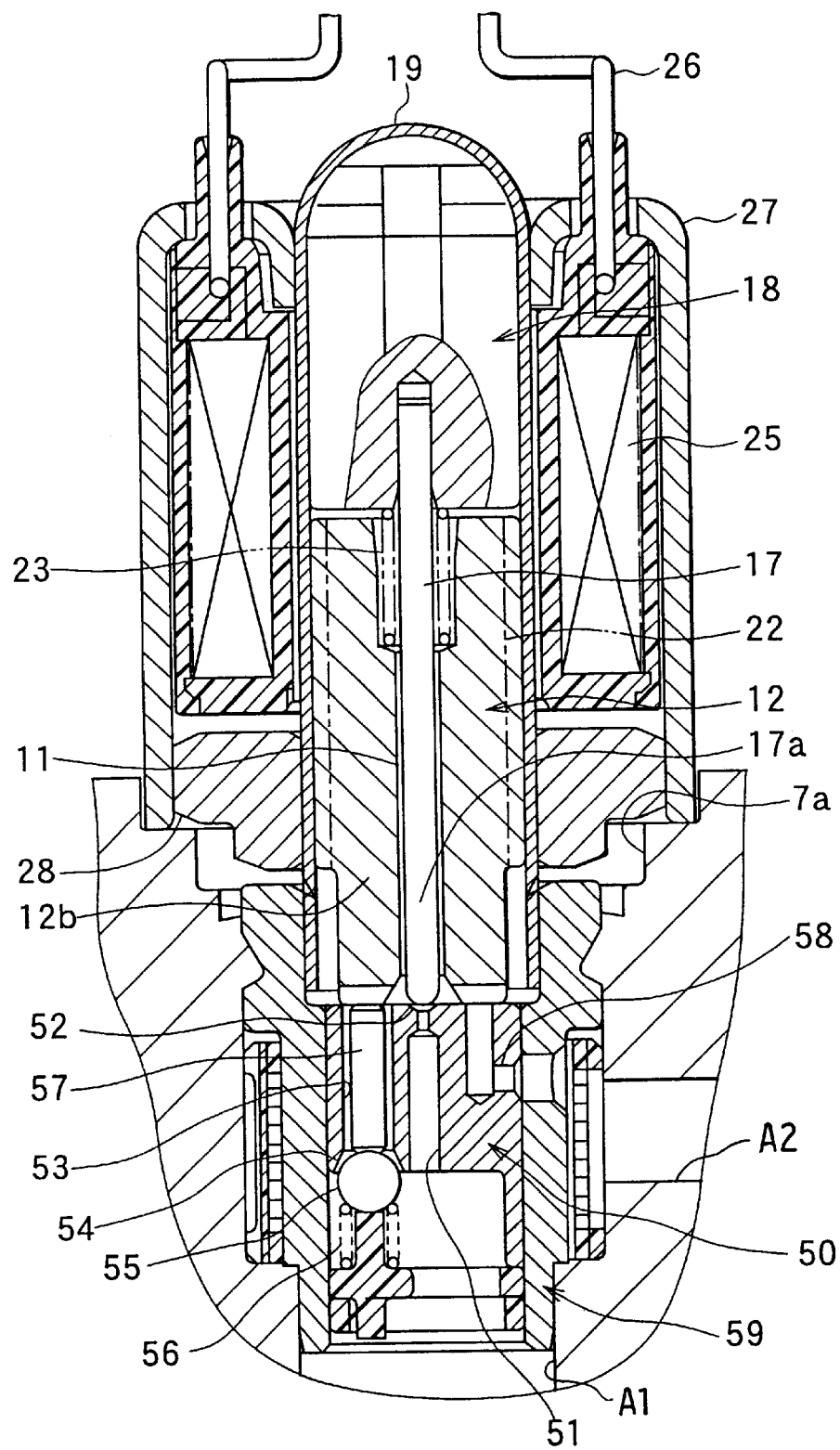
FIG. 13 is a cross sectional view of the pressure-increase control valve according to a eighth embodiment of the present invention.

A cross sectional view of the pressure-increase control valve 3 according to a eighth embodiment is shown in FIG. 13. The structure of the pressure-increase control valve 3 according to the eighth embodiment is modified from that of the second embodiment. Component parts same or similar to those of the second embodiment are shown with same reference numbers as the second embodiment.

Though the first plunger 12, the valve body 10 and the second seat valve 16 are integrated into one body according to the second embodiment, the first and second seat valves are integrated into a seat valve 50 according to the eighth embodiment.

As shown in FIG. 13, the seat valve 50 is provided with a communication path (valve hole) 51 having a valve seat 52 formed in a taper shape at a corner of the seat valve 50 on a downstream side of brake fluid flow in the communication path 51. The leading end 17a of the valve body 17 of the second plunger 18 is not seated on the valve seat 52 when the coil 25 is not energized but may be seated on the valve seat 52 s o as to interrupt the communication path 51 when the coil 25 is energized.

The seat valve 50 is also provided with a communication path 53 having a first valve seat 54 in parallel to the communication pat h 51. The valve seat 54 is formed in a taper shape at a corner of the seat valve 50 on an upstream side of brake fluid flow in the communication path 53. A ball 55 as a valve body is arranged at the valve seat 54 and the ball 55 is biased toward the valve seat 54 by a sp ring 56. W hen the ball 55 is seated on the valve seat 54, the communication path 53 is interrupted.

A pin 57 is arranged inside the communication path 53 to restrain the movement of the ball 55 in a direction of the valve seat 54 so that the ball 55 may not be seated on valve seat 54 when the coil 25 is not energized. However, when the first plunger 12 is moved in an upper direction of the drawing by energizing the coil 25, the ball 55 is seated on the valve seat 54 by a biasing force of the spring 56. The seat valve 50 is provided with a penetration hole 58 extending from an end face on a side of the first plunger 12 to an outer circumferential surface. Brake fluid from the conduit A1 via the communication paths 51 and 53 flows through the penetration hole to the conduit A2.

According to the eighth embodiment, the valve seat 50 is press fitted to an inside surface of a hollow shaped guide 59 and fixed to the hollowed portion 7a of the housing 7. In the pressure increase control valve 3 mentioned above, the first and second seat valves, for which precision machining and higher hardness are required, are integrated into a component part so that the seat valve 50 may be easily fabricated, while the fabrication of other component parts become simpler. As a result, a manufacturing productivity of the component parts constituting the pressure increase control valve 3 may be improved.

Next, the operation of the pressure increase control valve 3 is described.

When the coil 25 is not energized, the ball 55 is away from the valve seat 54 by the pin 57 so that the communication path 53 is at a communicating state. The communication path 51 is also at a communicating state since the valve body 17 is away from the valve seat 52. Brake fluid from the conduit A1 to the conduit A2 flows not only through the communication path 51 and the penetration hole 58 but also through the communication 53 and the penetration hole 58 so that the pressure increase control valve 3 is at the fully-open state.

When, after the coil 25 is once energized, the energisation of the coil 25 is stopped at the pressure-increase timing during the anti-skid control, the first plunger 12 is slidably moved in an upper direction in the drawing and the pin 57 and the ball 55 are moved in an upper direction in the drawing by the biasing force of the spring 56 so that the ball 55 is seated on the valve seat 54 to interrupt the communication path 53 . Brake fluid from the conduit A1 to the conduit A2 flows only through the communication path 51 and the penetration hole 58 to represent the half-open state.

Control method for energizing the coil 25 at the half-open state is same as described in the first embodiment.

Further, when the coil 25 is energized again at the pressure-decrease and pressure-hold timings during the anti-skid control, the second plunger 18 moves in a down direction in the drawing and the valve body 17 is seated on the valve seat 52 so that the communication path 51 may be interrupted. Thus, brake fluid flow from the conduit A1 to the conduit A2 flows are completely interrupted to represent the fully-closed state.

Ninth Embodiment

Figure 14:
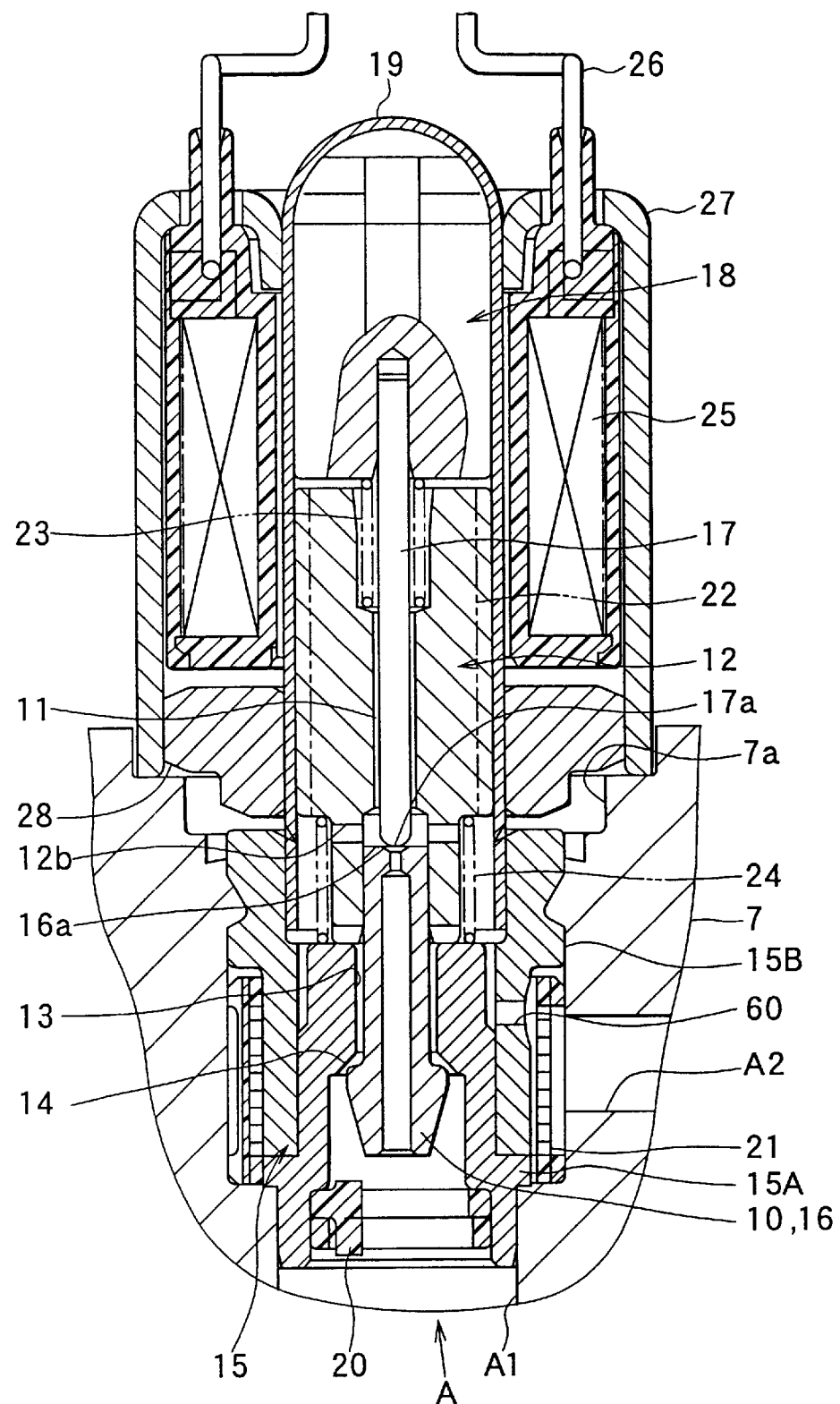
FIG. 14 is a cross sectional view of the pressure-increase control valve according to a ninth embodiment of the present invention.

A cross sectional view of the pressure-increase control valve 3 according to a ninth embodiment is shown in FIG. 14. The structure of the pressure-increase control valve 3 according to the ninth embodiment is modified from that of the second embodiment for easy assembly fabrication. Therefore, only the modified portions are described hereinafter.

According to the ninth embodiment, the first seat valve 15 of the first embodiment is divided into a seat valve portion 15A and a guide portion 15B. The valve seat portion 15A is formed nearly in a cylindrical shape and is provided with a communication path 13 into which a member (hereinafter called a combined member 10, 16) composing of the second seat valve 16 and the valve body 10 is inserted and a valve seat 14 on which the valve body 10 is seated.

The guide portion 15B has a hollowed portion and is formed in a cylindrical shape surrounding the outer circumference of the seat valve portion 15A and serves to fix the seat valve portion 15A to the hollowed portion 7a of the housing 7. An inside diameter of the hollowed portion of the guide portion 15B is larger than outside diameters of the first and second plungers 12 and 18 to an extent that the first and second plungers 12 and 18 may pass through the inside of the hollowed portion of the guide portion 15B. An opening side of the sleeve 19 is press fitted or fixed by welding to the inside of the hollowed portion of the guide portions 15B.

The outside diameter of the seat valve portion 15A is smaller on a side of the first plunger 12 and the smaller diameter portion of the seat valve portion 15A is press fitted to the guide portion 15B. The guide portion 15B is provided with a communication hole 60 through which brake fluid flows.

An assembly method of the pressure increase control valve 3 mentioned above is described below.

At first, the sleeve 19 is fixed to the followed portion of the guide portion 15B to constitute a sub-assembly. Then, the sub-assembly constituted by the sleeve 19 and the guide portion 15B is inserted into the yoke 27 where the coil 25 and the ring member 28 are arranged so that a yoke subassembly is constituted.

On the other hand, after aligning the respective positions of the first plunger 12, the spring 24 and the seat valve portion 15A, the combined member 10, 16 is press fitted into the communication path 11 from a side of the seat valve portion 15A to constitute a first plunger sub-assembly.

The second plunger 18 with the valve body 17 and the spring 23 are inserted into and, then, the first, plunger sub-assembly is press fitted into the yoke subassembly. Finally, the filter 20 is fixed with the seat valve portion 15A and the filter 21 is fixed with the guide portion 15B. Under the processes mentioned above, the assembly of the pressure increase control valve 3 is completed.

According to the ninth embodiment, on assembling the component parts, the component parts can be assembled from one direction into each of the sub-assemblies based on the sub-assembly constituted by the guide portion 15B and the sleeve 19.

Next, an assembly process of the pressure increase control valve 3 according to the second embodiment is described in reference with FIG. 7.

At first, after aligning the respective positions of the first plunger 12, the spring 24 and the first seat valve 15, the combined member 10, 16 is press fitted into the communication path 11 from a side of the second seat valve 15 to constitute a first plunger sub-assembly.

Next, the spring 23 and the valve body 17 fixed to the second plunger 18 are inserted into the,-communication path 11 of the first plunger sub-assembly from one side of the first plunger sub-assembly. Then, the sleeve 19 is covered on the first and second plungers 12 and 18 from the same side mentioned above and press fitted or fixed by welding to the first seat valve 15. Further, the yoke 27 in which the ring member 28 and the coil 25 are arranged is assembled from the same side as mentioned above in a manner that the sleeve 19 is inserted into the inside of the yoke 27.

Then, the filters 20 and 21 are fixed to the first seat valve 15 from the other side of the first plunger sub-assembly. Under the processes mentioned above, the assembly of the pressure increase control valve 3 is completed.

As mentioned above, assembly process of the pressure increase control valve 3 according to the ninth embodiment is simpler than that according to the second embodiment, since component parts are basically assembled from one direction without rotating holding jigs for automatic assembly.

Tenth Embodiment

Though the pressure-increase control valve 3, which is so called "normally open" state valve, is described in the first and ninth embodiments, the present invention is applicable to an electromagnetic valve 100 that is "normally closed" valve.

Figure 15:
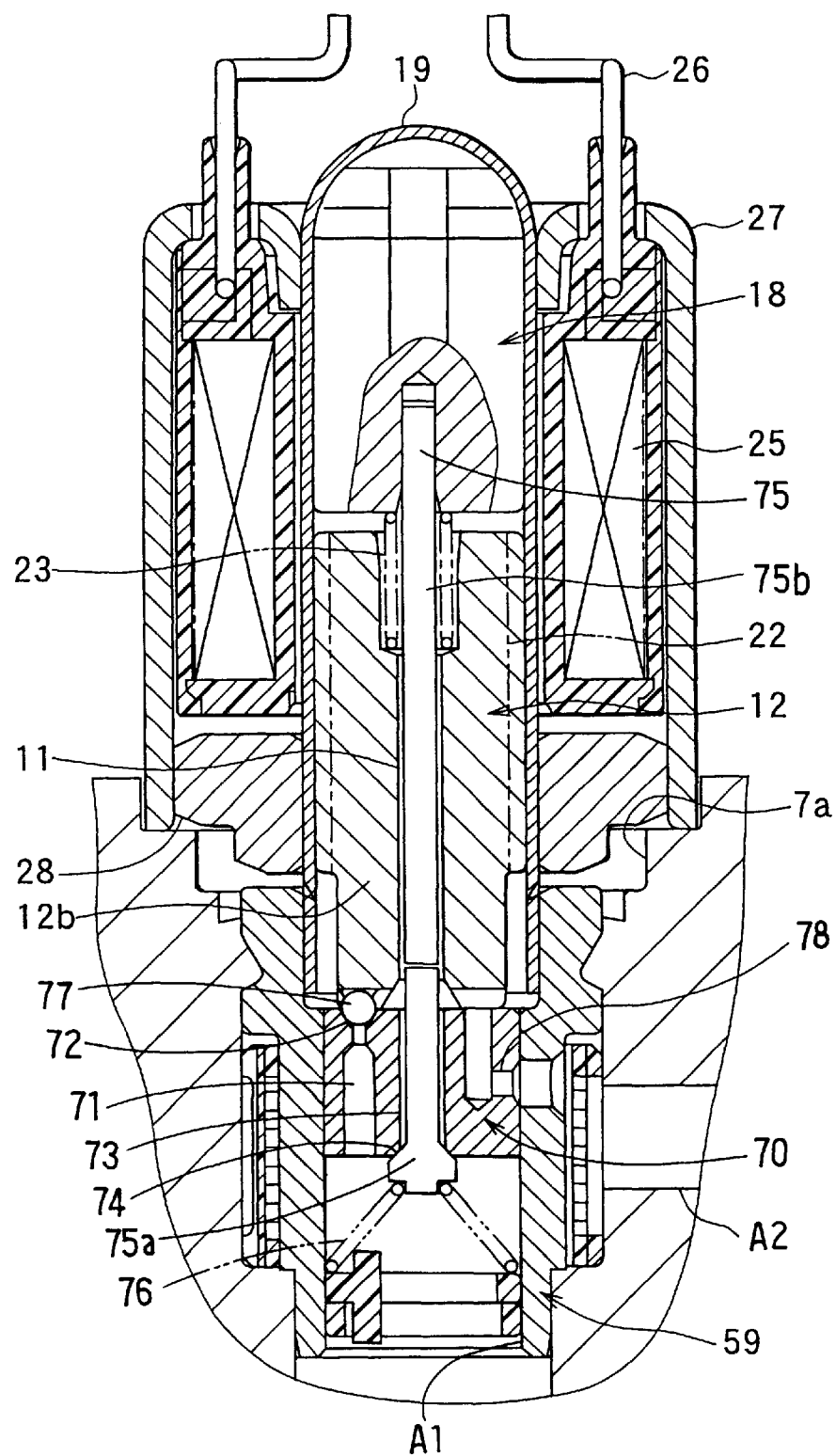
FIG. 15 is a cross sectional view of the electromagnetic valve according to a tenth embodiment of the present invention.

A cross sectional view of an electromagnetic valve 100 according to a tenth embodiment is shown in FIG. 15. The structure of the electromagnetic valve 100 according to the tenth embodiment is modified from that of the eighth embodiment. Component parts same or similar to those of the eight embodiment are shown with same reference numbers as the eighth embodiment.

As shown in FIG. 15, a seat valve 70 is provided with a communication path (valve hole) 71 having a valve seat 72 formed in a taper shape at a corner of the sea t valve 70 on a downstream side of brake fluid flow in the communication path 71. A ball shaped valve body 77 attached to the first plunger 12 is seated on the valve seat 72 so as to interrupt the communication path 71 when the coil 25 is not energized.

The seat valve 70 is also provided with a communication path 73 having a first valve seat in parallel to the communication path 71. The valve seat 74 is formed in a taper shape at a corner of the seat valve 70 on an upstream side of brake fluid flow in the communication path 73. A valve body 75 extending from the second plunger 18 is constituted by a base 75b and a leading end 75a. The base 75b and the leading end 75a are arranged with a gap therebetween in the communication path 11 of the first plunger 12. The leading end 75a of the valve body 75 is seated on the valve seat 74 and the valve body 75 is biased toward the valve seat 74 by a spring 76 so that the communication path 73 may be interrupted when the coil 25 is not energized.

When the second plunger 18 is moved in a down direction of the drawing by energizing the coil 25 so that the base 75b may pass through the gap between the base 75b and the leading end 75a and push the leading end 75a, the leading end 75a of the valve body 75 is left from the valve seat 74.

The seat valve 70 is provided with a penetration hole 78 extending from an end face on a side of the first plunger 12 to an outer circumferential surface. Brake fluid from the conduit A1 via the communication paths 71 and 73 flows through the penetration hole 78 to the conduit A2.

The valve seat 70 is press fitted to an inside surface of a hollow shaped guide 59 and fixed to the hollowed portion 7a of the housing 7.

Next, the operation of the electromagnetic valve 100 is described.

When the coil 25 is not energized, the leading end 75a of the valve body 75 is seated on the valve seat 74 so that the communication path 73 is at an interrupting state. The communication path 71 is also at an interrupting state since the valve body 77 is also seated on the valve seat 72. Brake fluid from the conduit A1 to the conduit A2 flows neither through the communication path 71 nor through the communication 73 so that the electromagnetic valve 100 is at the fully-closed state.

When, after the coil 25 is once energized, the energisation of the coil 25 is stopped, the first plunger 12 is slidably moved in an upper direction in the drawing so that the valve body 77 is away from the valve seat 72 to communicate the communication path 71 . Brake fluid from the conduit A1 to the conduit A2 flows only through the communication path 71 and the penetration hole 78 to represent the half-open state. Control method for energizing the coil 25 at the half-open state is same as described in the first embodiment.

Further, when the coil 25 is energized again, the second plunger 18 moves in a down direction in the drawing and the leading end 75a of the valve body 75 is away from the valve seat 74 so that the communication path 73 may be communicated. Thus, brake fluid flow from the conduit A1 to the conduit A2 flows not only through the communication path 71 but also through the communication path 73 to the penetration hole 78 to represent the fully-open state.

Although the present invention has been described in connection with the preferred embodiment thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An electromagnetic valve for brake fluid pressure control having an inlet and an outlet, comprising:

a first communication path connecting the inlet and the outlet for brake fluid flow;

a first valve seat provided within the first communication path;

a second communication path connecting the inlet and the outlet for brake fluid flow in parallel to the first communication path, one of the first and second communication paths having a throttle portion for partly restricting brake fluid flow;

a second valve seat provided within the second communication path;

a first plunger member being provided with a first valve being movable so as to come in contact with the first valve seat for closing and opening the first communication path, and further provided with a penetration hole constituting a part of the second communication path;

a second plunger member being provided with a second valve being movable in the penetration hole so as to come in contact with the second valve seat for closing and opening the second communication path, wherein the first and second plunger members are arranged axially in series with a gap therebetween;

a spring member disposed at least between the first and second plunger members for generating a spring biasing force against the first and second plunger members in a direction that the first and second plunger members move axially away from each other; and a coil member arranged around outer circumferences of the first and second plunger members for generating an electromagnetic attracting force, when energized, to move the first and second plunger members against the spring biasing force in a direction that the first and second plunger members come close to each other so that the first valve is moved from an upstream side of brake fluid flow to a downstream side thereof and the second valve is moved from the downstream side thereof to the upstream side thereof, the first and second plunger members being at rest positions at an original stage that the coil member is not energized, being driven to come closer to each other at an initial stage that the coil member is initially energized, and being further driven to come closest to each other at a final stage that the coil member is fully energized;

wherein the electromagnetic valve is controlled in any one of three operating states representing a fully-open state that both the first and second communication paths are open, and the coil member is at one stage of the original and final stages, a half-open state that the one of the first and second communication paths having the throttle portion is opened and the other one of the first and second communication paths is closed, and the coil member is at the initial stage, and a fully-closed state that both the first and second communication paths are closed, and the coil member is at the other stage of the original and final stages.

2. An electromagnetic valve according to claim 1, further comprising:

a first seat valve arranged at a position facing the first plunger member on an opposite side to the second plunger member, the first seat valve having the first valve seat formed at the first communication path, wherein, the second valve seat is formed in the penetration hole and is arranged on a side of the second plunger member with respect to the throttle portion, the first valve has a first valve body to be seated on the first valve seat, and the second valve has a second valve body to be seated on the second valve seat.

3. An electromagnetic valve according to claim 2, wherein the coil member has a cylindrical sleeve made of basically magnetic material in which the first and second plunger members are slidably housed, the sleeve having non-magnetic substance at a place corresponding to an outer circumference of the gap between the first and second plunger members.

4. An electromagnetic valve according to claim 3, wherein the first seat valve is housed inside an opening of the sleeve together with the first and second plunger members.

5. An electromagnetic valve according to claim 2, wherein the first valve seat is constituted by forming a step portion at a leading end of the first communication path on an upstream side of brake fluid flow, an outer diameter of the step portion on the upstream side being larger than that on a downstream side of brake fluid flow, and the first valve is inserted into the first communication path until a leading end of the first valve protrudes out of the step portion on the upstream side, the leading end of the first valve being provided with the first valve body to be moved in the downstream direction and be seated on the first valve seat when the coil member is energized at the initial step so that the first and second plunger member come closer to each other.

6. An electromagnetic valve according to claim 2, wherein the first seat valve is provided with a seat valve penetration hole constituting a part of the first communication path at a downstream side of the first valve seat to the outlet.

7. An electromagnetic valve according to claim 2, wherein the second valve seat and the first valve are integrated in to one body.

8. An electromagnetic valve according to claim 4, wherein the coil member comprises a coil, a yoke surrounding an outer circumference of the coil, a cylindrical sleeve made of non-magnetic material in which the first and second plunger members are slidably housed, and a ring member made of magnetic material disposed between the yoke and the first seat valve without intervening the sleeve.

9. An electromagnetic valve according to claim 2, wherein the first seat valve comprises a nearly cylindrical seat valve member constituting the first valve seat and a part of the first communication path and a nearly cylindrical guide member surrounding an outer circumference of the seat valve member, an inside diameter of the guide member is larger than each of outside diameters of the first and second plunger members.

10. An electromagnetic valve according to claim 2, wherein the first seat valve is provided with a conduit in parallel to the first communication path for connecting the inlet and the outlet for brake fluid flow and provided with a relief valve for allowing brake fluid flow through the conduit from an outlet side to an inlet side only when brake fluid pressure on the outlet side is higher than that on the inlet side.

11. An electromagnetic valve according to claim 1, further comprising:

a seat valve arranged at a position facing the first plunger member on an opposite side to the second plunger member, the seat valve having the first valve seat formed at the first communication path and the second valve seat formed at the second communication path, wherein the first valve has a first valve body to be seated on the first valve seat, and the second valve has a second valve body to be seated on the second valve seat.

12. An electromagnetic valve according to claim 11, wherein the first valve seat is constituted by forming a step portion at a leading end of the first communication path on an upstream side of brake fluid flow, an outer diameter of the step portion on the upstream side being larger than that on a downstream side of brake fluid flow, and the first valve comprises the first valve body disposed adjacent to the first valve seat on the upstream side and urged toward the first valve seat and a pin inserted into the first communication path for preventing the first valve body from being seated on the first valve seat when the coil member is not energized, the first valve body being moved together with the pin in the downstream direction and being seated on the first valve seat when the coil member is energized at the initial step so that the first and second plunger member come closer to each other.

13. An electromagnetic valve according to claim 1, wherein the spring member comprises a first spring disposed between the first and second plunger members for generating a first spring biasing force in a direction that the first and second plunger member move away from each other, and a second spring disposed at an end of the first plunger member on an opposite side of the second plunger member for generating a second spring biasing force in a direction that the first plunger member comes close to the second plunger member, the first spring biasing force being larger than the second spring biasing force and the spring biasing force being a sum of the first and second springs.

14. An electromagnetic valve according to claim 13, wherein an area of the first valve to receive brake fluid pressure on an upstream side of the first valve is defined to be large enough to generate a pressure biasing force due to brake fluid pressure difference between the upstream side of the first valve and a downstream side thereof that is larger than the sum of the first and second spring biasing forces in the half-open state.

15. An electromagnetic valve according to claim 1, wherein the second communication path has the throttle portion, and the electromagnetic valve is in the fully-open state when the coil member is not energized at the original stage, in the fully-closed state when the coil member is energized at the final stage, and in the half-open state that the first communication path is closed and the second communication path is opened when, after the coil member is once energized in a pulsating way at the initial stage, energizing the coil member is stopped.

16. An electromagnetic valve according to claim 1, wherein the first communication path has the throttle portion, and the electromagnetic valve is in the fully-closed state when the coil member is not energized at the original stage, in the fully-open state when the coil member is energized at the final stage, and in the half-open state that the first communication path is opened and the second communication path is closed when, after the coil member is once energized in a pulsating way at the initial stage, energizing the coil member is stopped.

17. An electromagnetic valve according to claim 1, wherein an area of the first valve to receive brake fluid pressure on an upstream side of the first valve is defined to be large enough to generate a pressure biasing force due to brake fluid pressure difference between the upstream side of the first valve and a downstream side thereof that is larger than the spring biasing force in the half-open state.

18. An electromagnetic valve according to claim 1, wherein a moving distance of the second plunger member is longer than that of the first plunger member so that a lift stroke of the second valve is longer than that of the first valve.

19. A brake pressure control system having a hydraulic conduit provided with the electromagnetic valve according to claim 1 for controlling brake fluid flow between a master cylinder and a wheel cylinder, wherein the inlet of the electromagnetic valve is connected to the hydraulic conduit on a side of the master cylinder and the outlet of the electromagnetic valve is connected to the hydraulic conduit on a side of the wheel cylinder.

* * * * *